(12) United States Patent
Asano (10) Patent No.: US 9,712,641 B2
(45) Date of Patent: Jul. 18, 2017

(54) IMAGE FORMING APPARATUS AND EVENT NOTIFICATION SYSTEM THAT REDUCES LOAD OF SERVER FOR HELPING EVENT NOTIFICATION

(71) Applicant: Kyocera Document Solutions Inc., Osaka (JP)

(72) Inventor: Takehiko Asano, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 195 days.

(21) Appl. No.: 14/622,917

(22) Filed: Feb. 16, 2015

(65) Prior Publication Data

US 2015/0237162 A1    Aug. 20, 2015

(30) Foreign Application Priority Data

Feb. 19, 2014 (JP) .................................. 2014-029094

(51) Int. Cl.
| | |
|---|---|
| *G06F 15/16* | (2006.01) |
| *H04L 29/08* | (2006.01) |
| *G06F 9/54* | (2006.01) |
| *G06F 3/12* | (2006.01) |
| *H04N 1/00* | (2006.01) |

(52) U.S. Cl.
CPC ............. *H04L 67/32* (2013.01); *G06F 3/12* (2013.01); *G06F 9/542* (2013.01); *H04N 1/00222* (2013.01)

(58) Field of Classification Search
CPC  H04L 67/32; G06F 3/12; G06F 9/542; H04N 1/00222

USPC ......................................... 709/219
See application file for complete search history.

(56) References Cited

U.S. PATENT DOCUMENTS

| | | | |
|---|---|---|---|
| 8,401,032 B2* | 3/2013 | Hundscheidt | H04L 12/18 370/352 |
| 2003/0211859 A1* | 11/2003 | Chen | H04L 12/189 455/518 |

(Continued)

FOREIGN PATENT DOCUMENTS

| | | |
|---|---|---|
| JP | 2011-142412 A | 7/2011 |
| JP | 2013-156809 A | 8/2013 |

*Primary Examiner* — James Conaway
(74) *Attorney, Agent, or Firm* — James Judge (57) ABSTRACT

An image forming apparatus includes an event notification data preparing unit, an event notification data transmitting unit, an information-processor count calculating unit, and an information-processor count determining unit. The information-processor count calculating unit calculates a count of the at least one information processor to which the event notification data is transmitted. The information-processor count determining unit determines whether the information-processor count is equal to or less than an upper limit value for the event notification count. The event notification data transmitting unit directly transmits the event notification data to the at least one information processor if the information-processor count is equal to or less than the upper limit value for the event notification count, and via the server transmits the event notification data to the at least one information processor if the information-processor count is more than the upper limit value for the event notification count.

4 Claims, 4 Drawing Sheets

(56) References Cited

U.S. PATENT DOCUMENTS

| | | | |
|---|---|---|---|
| 2004/0158872 A1* | 8/2004 | Kobayashi | H04L 12/1886 725/120 |
| 2005/0220064 A1* | 10/2005 | Hundscheidt | H04L 12/18 370/342 |
| 2007/0147411 A1* | 6/2007 | Bijwaard | H04L 12/185 370/432 |
| 2008/0147777 A1* | 6/2008 | Azulai | G06F 9/541 709/202 |
| 2008/0228915 A1* | 9/2008 | Tamura | G06F 9/542 709/224 |
| 2009/0225356 A1* | 9/2009 | Satoh | G06F 21/608 358/1.15 |
| 2011/0002007 A1* | 1/2011 | Okada | H04N 1/00222 358/1.15 |
| 2011/0026942 A1* | 2/2011 | Naito | G06F 11/0733 399/8 |
| 2012/0212778 A1* | 8/2012 | Sakai | G06K 15/402 358/1.15 |

* cited by examiner

IMAGE FORMING APPARATUS AND EVENT NOTIFICATION SYSTEM THAT REDUCES LOAD OF SERVER FOR HELPING EVENT NOTIFICATION

INCORPORATION BY REFERENCE

This application is based upon, and claims the benefit of priority from, corresponding Japanese Patent Application No. 2014-029094 filed in the Japan Patent Office on Feb. 19, 2014, the entire contents of which are incorporated herein by reference.

BACKGROUND

Unless otherwise indicated herein, the description in this section is not prior art to the claims in this application and is not admitted to be prior art by inclusion in this section.

An image forming apparatus, which is a printer, or a multifunction peripheral (MFP), notifies an event to a personal computer (PC) using an event notification system (WS-Eventing) on the network when a state change (hereinafter referred to as, an "event"), such as a start of job, an abort of job, a termination of job, an out of paper sheet, an out of toner, a paper jam, or a similar event occurs. The event notification system of WS-Eventing (hereinafter referred to as "event notification system") notifies an event to a preliminarily registered PC only, from the image forming apparatus. For example, in a typical event notification system, the network connects an information processor to a plurality of image forming apparatuses. This event notification system notifies an event, which occurs on the image forming apparatus, to the information processor based on kinds of registered event in response to a request from the information processor to the image forming apparatus and a notifying address.

SUMMARY

An image forming apparatus according to an embodiment of the present disclosure is connectable to a server and at least one information processors via a network. The image forming apparatus includes an event notification data preparing unit, an event notification data transmitting unit, an information-processor count calculating unit, and an information-processor count determining unit. The event notification data preparing unit prepares event notification data of a generated event. The event notification data transmitting unit transmits the event notification data to the information processor. The information-processor count calculating unit calculates a count of the at least one information processors to which the event notification data is to be transmitted. The information-processor count determining unit determines whether the information-processor count is equal to or less than an upper limit value of the event notification count. The event notification data transmitting unit: directly transmits the event notification data to the at least one information processors if the information-processor count is equal to or less than the upper limit value of the event notification count; and transmits the event notification data to the at least one information processors via the server if the information-processor count is more than the upper limit value of the event notification count.

These as well as other aspects, advantages, and alternatives will become apparent to those of ordinary skill in the art by reading the following detailed description with reference where appropriate to the accompanying drawings.

Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

An event notification system according to the embodiment determines whether the image forming apparatus can directly notify PCs of an event, considering a count of the information processors (PCs) to be notified an event by the image forming apparatus and a performance of the image forming apparatus. Then, the image forming apparatus directly notifies the PCs of the event only when possible. When not possible, the image forming apparatus notifies the PCs of the event via a server that helps to notify the event (hereinafter referred to as "event notification support server"). This distributes the load to the image forming apparatus and the event notification support server.

Figure 1:
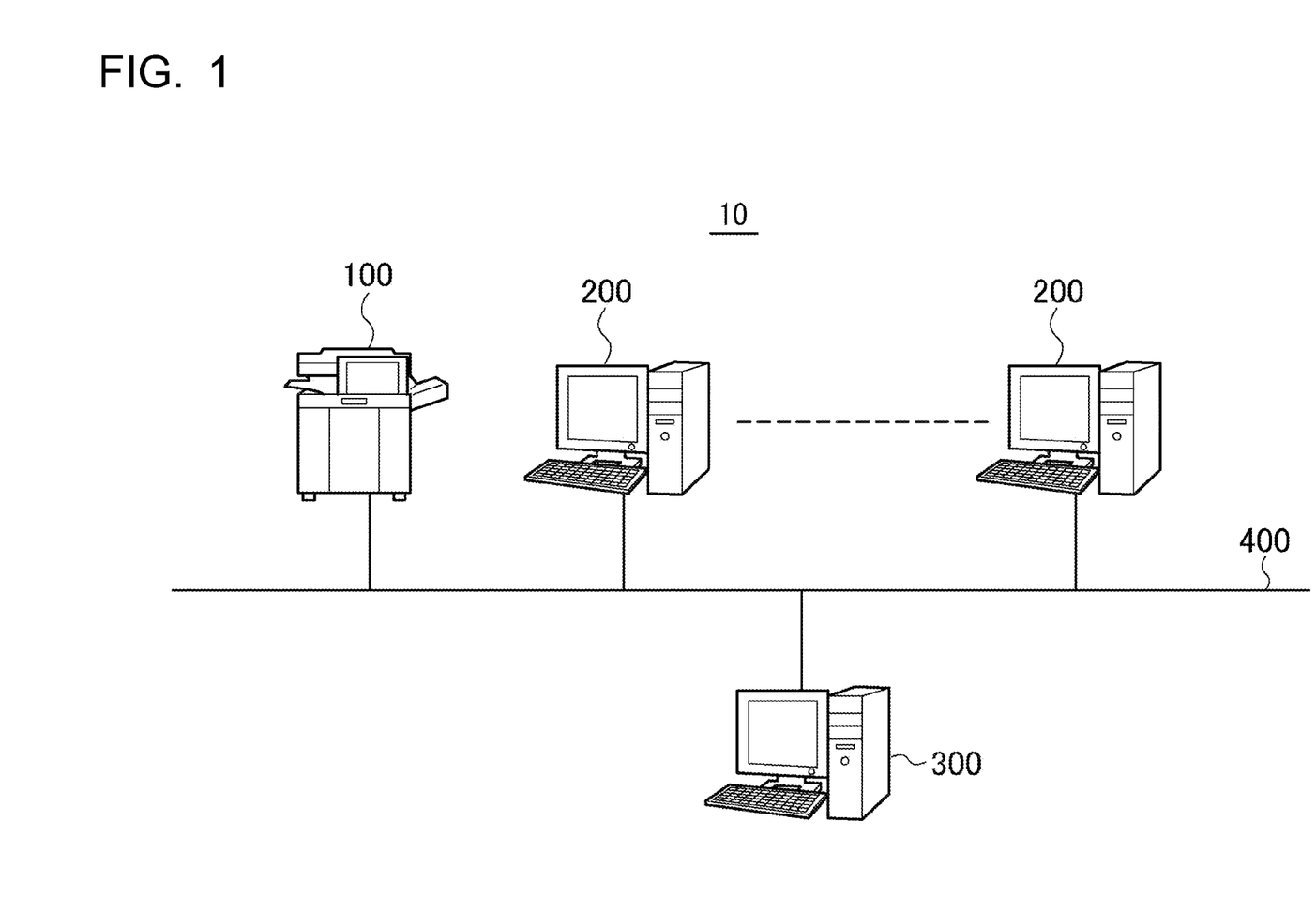
FIG. 1 illustrates a schematic diagram of a configuration of an event notification system according to an embodiment of the present disclosure.

FIG. 1 illustrates a schematic diagram of a configuration of an event notification system according to an embodiment of the present disclosure. The event notification system 10 includes an image forming apparatus 100, a plurality of PCs 200, an event notification support server 300, and a network 400.

The image forming apparatus 100 is a printer or a multifunction peripheral. The image forming apparatus 100 prints image data directly read from an original document on a platen or image data transmitted from the PC 200. The image forming apparatus 100 notifies the preliminarily registered PC 200 of the event when an event occurs.

The PC 200 includes a printer driver installed for the image forming apparatus 100. The PC 200 transmits print request data, which stores image data of an original document to be printed and similar data, to the image forming apparatus 100. The PC 200 stores event notification data received from the image forming apparatus 100, and displays the event notification data on an operation display panel.

The event notification support server 300 is a computer such as PC. When the event notification support server 300 receives event notification data transmitted from the image forming apparatus 100, the event notification support server 300 transmits the event notification data to the PC 200 whose destination address is set on the event notification data.

The network 400 is a network, such as a Local Area Network (LAN). The network 400 connects the image forming apparatus 100, the plurality of PCs 200, and the event notification support server 300. Then, the network 400 transmits and receives various kinds of data.

Figure 2:
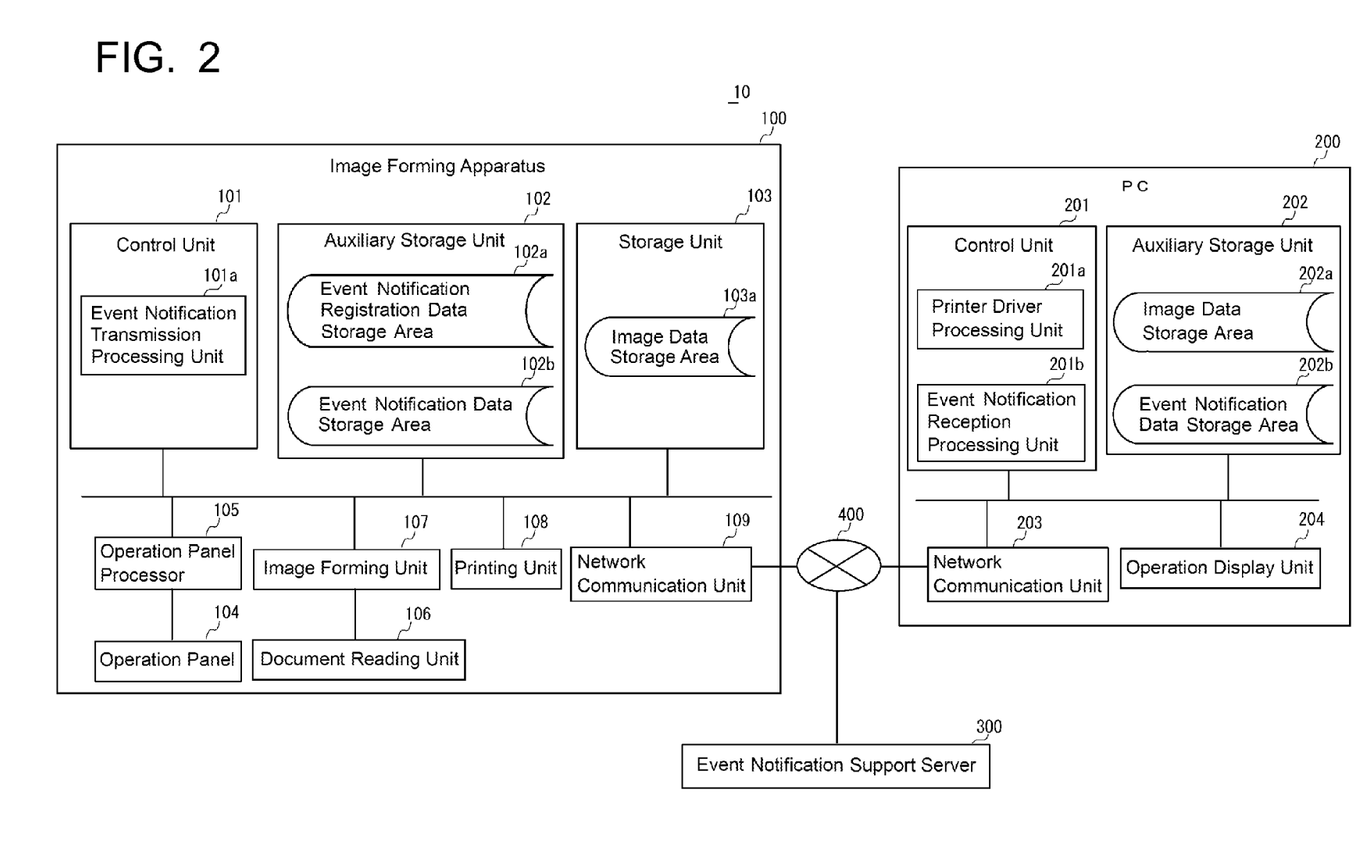
FIG. 2 illustrates a schematic diagram of functional block configurations of an image forming apparatus and an information processor which are included in the event notification system.

FIG. 2 illustrates a schematic diagram of functional block configurations of an image forming apparatus and an information processor which are included in the event notification system. The image forming apparatus 100 includes a control unit 101, an auxiliary storage unit 102, a storage unit 103, an operation panel 104, an operation panel processor 105, a document reading unit 106, an image forming unit 107, a printing unit 108, and a network communication unit 109. These units are connected via a bus or a similar connection.

The control unit 101 includes control units such as a Micro Processing Unit (MPU) and a Central Processing Unit (CPU). The control unit 101 controls the overall image forming apparatus 100 including an interface such as various kinds of I/Os and a Universal Serial Bus (USB) and a bus controller, and similar devices. The control unit 101 includes an event notification transmission processing unit 101a. The event notification transmission processing unit 101a notifies the preliminarily registered PC 200 of an event when the event occurs in the image forming apparatus 100. The details of an event notification transmitting process performed by the event notification transmission processing unit 101a will be described later.

The auxiliary storage unit 102 is an auxiliary storage device including a flash memory and similar storages. The auxiliary storage unit 102 stores programs and data to be executed by the control unit 101. The auxiliary storage unit 102 includes an event notification registration data storage area 102a and an event notification data storage area 102b. The event notification registration data storage area 102a stores event notification registration data received from the PC 200 that requests an event notification. In the event notification registration data, a destination of address of the PC 200 is set. The event notification data storage area 102b stores data (hereinafter referred to as "event notification data") prepared by the image forming apparatus 100 so as to notify the PCs 200 of an event that has occurred in the image forming apparatus 100.

The storage unit 103 is a hard disk drive that stores data and programs. The storage unit 103 includes an image data storage area 103a. The image data storage area 103a stores image data image formed by the image forming unit 107 from an original document read by the document reading unit 106, and image data received from the PC 200 via the network communication unit 109.

The operation panel 104 displays an operating menu and accepts an operation by a finger of a user. The user can enter various kinds of information to be set to the image forming apparatus 100 from the operation panel 104.

The operation panel processor 105 displays functional operation items of the image forming apparatus 100 on the operation panel 104. The operation panel processor 105 receives operation data according to an operation of the user and setting data to the image forming apparatus 100 via the operation panel 104.

The document reading unit 106 reads an original document set on the platen of the image forming apparatus 100. In response to a read request from the operation panel 104 by the user, the document reading unit 106 reads an original document set on the platen of the image forming apparatus 100.

The image forming unit 107 converts the original document, which is read by the document reading unit 106 in response to a read request by the user, into image data in a data format that ensures printing by the printing unit 108 or sending by FAX or E-mail.

The printing unit 108 prints image data corresponding to the print request by the user.

The network communication unit 109 includes an attachable/detachable LAN interface connectable to the network 400. The LAN interface includes a network unit that intelligently transmits and receives by various kinds of network protocols such as a TCP/IP, an AppleTalk, and a SMB Next, the following describes a functional configuration of the PC 200 with reference to FIG. 2. As illustrated in FIG. 2, the PC 200 includes a control unit 201, an auxiliary storage unit 202, a network communication unit 203, and an operation display unit 204, which are connected via a bus or a similar connection.

The control unit 201 includes a main storage unit such as a RAM and a ROM and a control unit such as a CPU. The control unit 201 controls the overall PC 200 including an interface such as various kinds of I/Os and a Universal Serial Bus (USB), and a bus controller, and similar device. The control unit 201 includes a printer driver processing unit 201a and an event notification reception processing unit 201b. The printer driver processing unit 201a transmits print request data, which includes image data and similar data stored by a user, via the network communication unit 203 to the image forming apparatus 100. When the event notification reception processing unit 201b receives event notification data from the image forming apparatus 100, this event notification reception processing unit 201b preliminarily transmits event notification request data, where a destination address of the PC 200 of this event notification reception processing unit 201b is set, via the network communication unit 203 to the image forming apparatus 100. The event notification reception processing unit 201b receives event notification data transmitted from the image forming apparatus 100 via the network communication unit 203. Thus, the event notification reception processing unit 201b functions as an event notification data receiving unit.

The auxiliary storage unit 202 is an auxiliary storage device including a flash memory and similar storages. The auxiliary storage unit 202 stores programs and data to be executed by control unit 201. The auxiliary storage unit 202 includes an image data storage area 202a and an event notification data storage area 202b. The image data storage area 202a stores image data and similar data read by a scanner or similar input device. The image data is taken out when the image forming apparatus 100 is requested to print. The event notification data storage area 202b stores the event notification data transmitted from the image forming apparatus 100. The event notification data is taken out when the event notification data is displayed on the operation display unit 204.

The network communication unit 203 includes an attachable/detachable LAN interface connectable to the network 400. The LAN interface includes a network unit that intelligently transmits and receives by various kinds of network protocols such as a TCP/IP, an AppleTalk, and a SMB.

The operation display unit 204 includes an operation display panel. The operation display unit 204 receives a user operation through the operation display panel and displays a user operation result and the event notification data received from the image forming apparatus 100.

Figure 3:
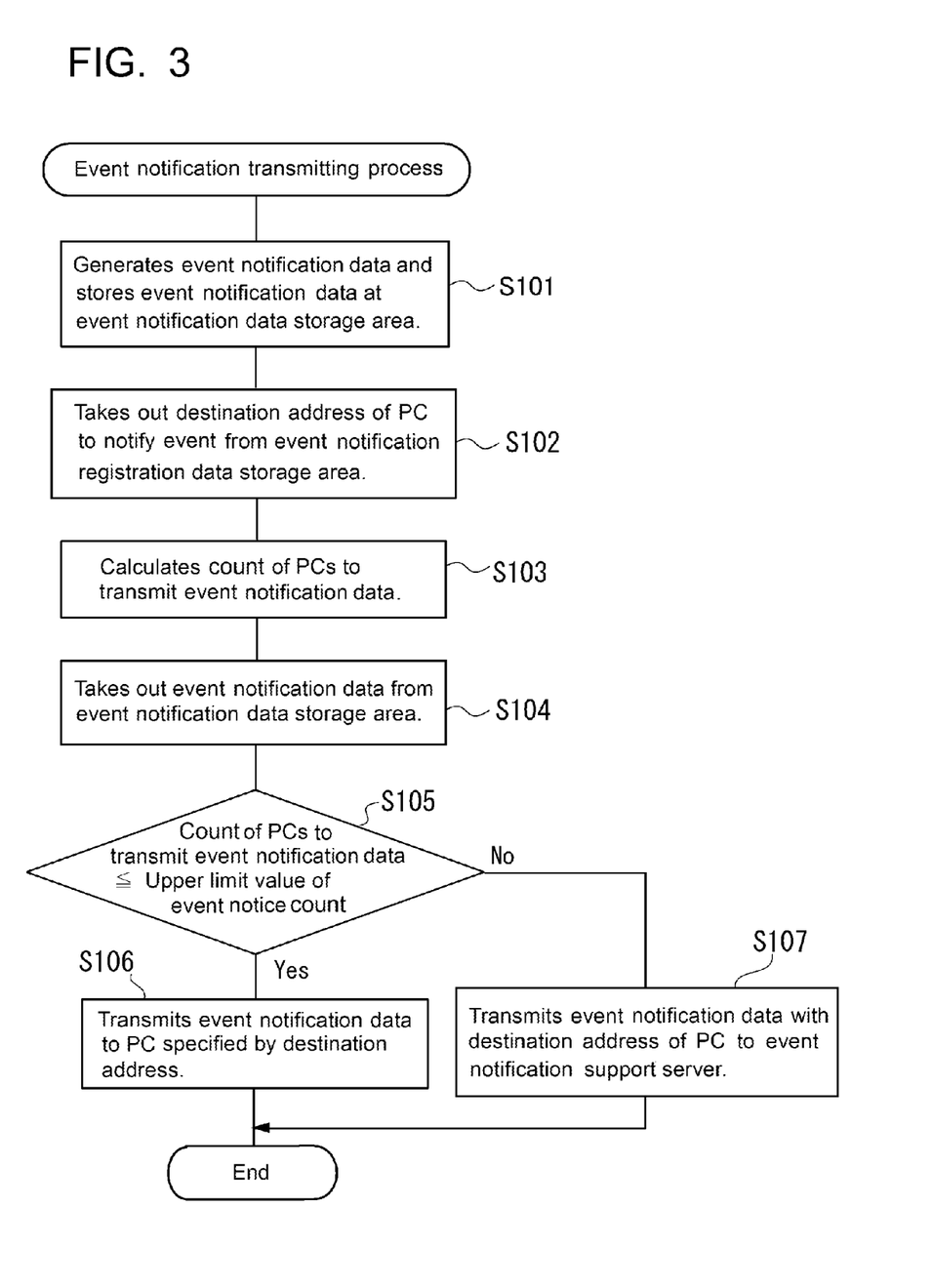
FIG. 3 illustrates a flowchart of an event notification transmitting process by the image forming apparatus.

Next, the event notification transmission processing unit 101a located at the control unit 101 in the image forming apparatus 100 executes event notification transmitting process. FIG. 3 illustrates a flowchart of the event notification transmitting process by the image forming apparatus.

To receive the event notification data from the image forming apparatus 100, the user preliminarily transmits the event notification registration data to the image forming apparatus 100. When the image forming apparatus 100 receives the event notification registration data from the PC 200, the event notification registration data storage area 102a in the auxiliary storage unit 102 stores the event notification registration data. Next, when the control unit 101 in the image forming apparatus 100 detects an event occurrence, the image forming apparatus 100 activates the event notification transmission processing unit 101a, and then the event notification transmission processing unit 101a starts the event notification transmitting process. Thus, the PC 200 functions as an event notification registration data transmitting unit, and the image forming apparatus 100 functions as an event notification registration data receiving unit.

Step S101

First, the event notification transmission processing unit 101a prepares event notification data of an event that has occurred, and stores the event notification data at the event notification data storage area 102b in the auxiliary storage unit 102. Thus, the event notification transmission processing unit 101a functions as an event notification data preparing unit.

Step S102

Next, the event notification transmission processing unit 101a takes out event notification registration data from the event notification registration data storage area 102a in the auxiliary storage unit 102, and then takes out a destination address of the PC 200 that is set on the event notification registration data for notifying an event.

Step S103

Then, the event notification transmission processing unit 101a calculates a count of the PCs 200, to which the event notification data is to be transmitted, using the event notification registration data taken out at Step S102. Thus, the event notification transmission processing unit 101a functions as an information-processor count calculating unit.

Step S104

Furthermore, the event notification transmission processing unit 101a takes out event notification data of an event that has newly occurred from the event notification data storage area 102b in the auxiliary storage unit 102.

Step S105

Next, the event notification transmission processing unit 101a determines whether the count of the PCs 200, to which the event notification data is to be transmitted and calculated at Step S103, is equal to or less than the upper limit value of an event notification count or not. When a count of the PCs 200 to which the event notification data is to be transmitted is equal to or less than the upper limit value of an event notification count (Yes at Step S105), the process proceeds to Step S106. When a count of the PCs 200 to which the event notification data is to be transmitted is more than the upper limit value of an event notification count (No at Step S105), the process proceeds to Step S107. Thus, the event notification transmission processing unit 101a functions as an information-processor count determining unit.

Step S106

When determined to be Yes at step S105, the event notification transmission processing unit 101a directly transmits the event notification data to the PC 200 specified by the destination address that is taken out at Step S102, and terminates the event notification transmitting process. Thus, the event notification transmission processing unit 101a functions as an event notification data transmitting unit.

Step S107

When determined to be No at step S105, the event notification transmission processing unit 101a transmits the event notification data, where the destination address of the PC 200 taken out at Step S102 is set, to the event notification support server 300, and terminates the event notification transmitting process. When the event notification support server 300 receives the event notification data, the event notification support server 300 transmits the event notification data to the PC 200 at the destination address.

Figure 4:
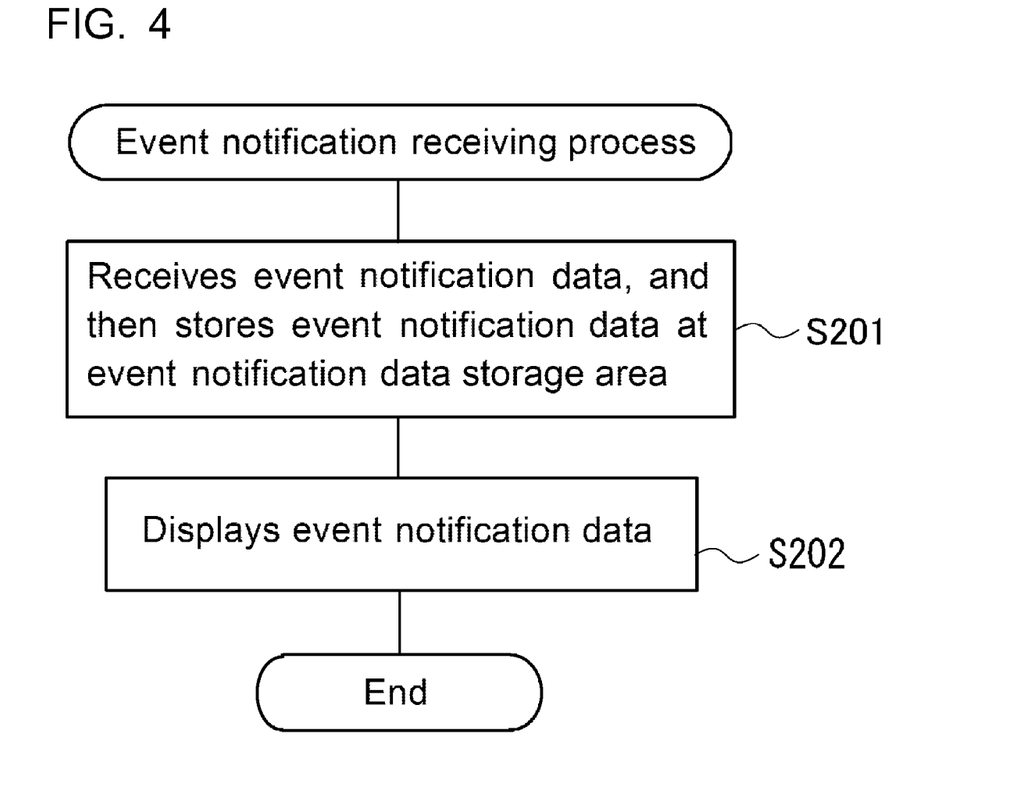
FIG. 4 illustrates a flowchart of an event notification receiving process by the information processor.

Next, the event notification reception processing unit 201b located at the control unit 201 in the PC 200 executes an event notification receiving process. FIG. 4 illustrates a flowchart of the event notification receiving process by the information processor.

When the PC 200 receives the event notification data from the image forming apparatus 100 or the event notification support server 300 by the network communication unit 203, the control unit 201 activates the event notification reception processing unit 201b, and then the event notification reception processing unit 201b starts the event notification receiving process.

Step S201

First, the event notification reception processing unit 201b stores the received event notification data at the event notification data storage area 202b in the auxiliary storage unit 202.

Step S202

Next, the event notification reception processing unit 201b displays the received event notification data on the operation display panel in the operation display unit 204, and then terminates the event notification receiving process.

In the above-described event notification system, when the image forming apparatus 100 has the upper limit of an event notification count depending on the performance of the image forming apparatus 100, it is determined whether the count of the PCs 200 to be notified of the event is equal to or less than the upper limit of an event notification count or not. This determines whether the image forming apparatus 100 can directly notify the PC 200 of the event or not. Thus, when it is determined whether the image forming apparatus 100 cannot directly notify the PC 200 of the event, the PC 200 is notified of the event via the event notification support server 300. This distributes the load to the image forming apparatus 100 and the event notification support server 300, thus ensuring the reduced load of the event notification support server 300.

While in the embodiments, when requesting an event notification to the image forming apparatus 100, the event request data where the destination address of the PC 200 is set is transmitted to the image forming apparatus 100, it is also possible to set specific kinds of events on the event notification request data for limiting the kinds of events. For example, the kind of events is event categorization, such as an event related to a job processing, a soft error processing, and a hard error processing. When the image forming apparatus 100 receives the event notification request data where a kind of event is set from the PC 200, only if an event belonging to the set kind of event occurs, the image forming apparatus 100 can transmit the event notification request data to the PC 200 where the kind of events to notify is set. The network 400 connects to the one image forming apparatus 100. This, however, should not be construed in a limiting sense. The network 400 can also connect to a plurality of image forming apparatuses 100 including the function of the disclosure. The PC 200 can connect to the network 400, and be an information processor, such as a smart phone, a mobile phone, or a tablet terminal that can have the function of the event notification reception processing unit 201*b*.

The image forming apparatus and the event notification system according to the disclosure can reduce the load of the server that helps to notify an event.

The disclosure is appropriate for an image forming apparatus and an event notification system; however, this should not be limited to the image forming apparatus and the event notification system. The disclosure is applicable to general apparatuses and systems that notify an event.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus connectable to a server and a plurality of information processors via a network, the image forming apparatus comprising:
   a control unit including one of either a micro-processing unit or a central processing unit that controls the image forming apparatus overall;
   a storage device including a hard disk drive that stores image data; and
   an auxiliary storage device including a flash memory; wherein
   the auxiliary storage device stores i) event notification registration data including destination addresses of each, and received from each, information processor of the plurality of information processors that request an event notification, and ii) event notification data prepared by the image forming apparatus so as to notify the plurality of information processors of an event occurrence in the image forming apparatus; and
   the control unit
      prepares the event notification data for the event occurrence, when detecting the event occurrence,
      retrieves the event notification registration data from the auxiliary storage device and then retrieves the destination address of each of the plurality of information processors that requested the event notification,
      calculates a count of the plurality of information processors to which the event notification data is to be transmitted using the event notification registration data,
      retrieves the event notification data for the event occurrence from the auxiliary storage device,
      determines whether the count of the plurality of information processors that requested the event notification is equal to or less than an upper limit value for an event notification count,
      transmits the event notification data to each of the plurality of information processors that requested the event notification as specified by the destination addresses when the count of the plurality of information processors is equal to or less than the upper limit value for the event notification count, and
      transmits the event notification data, wherein the destination address of each of the plurality of information processors that requested the event notification is sent to the server and the event notification data is transmitted via the server to each of the plurality of information processors that requested the event notification as specified by the destination addresses when the count of the plurality of information processors is more than the upper limit value for the event notification count.

2. An event notification system, comprising:
   an image forming apparatus connectable to a network;
   a plurality of information processors connectable to the network; and
   a server connectable to the network;
   the image forming apparatus comprising
      a control unit including one of either a micro-processing unit or a central processing unit that controls the image forming apparatus overall,
      a storage device including a hard disk drive that stores image data, and
      an auxiliary storage device including a flash memory, wherein
      the auxiliary storage device stores i) event notification registration data including destination addresses of each, and received from each, information processor of the plurality of information processors that request an event notification, and ii) event notification data prepared by the image forming apparatus so as to notify the plurality of information processors of an event occurrence in the image forming apparatus,
      the control unit
         prepares the event notification data for the event occurrence, when detecting the event occurrence,
         retrieves the event notification registration data from the auxiliary storage device and then retrieves the destination address of each of the plurality of information processors that requested the event notification,
         calculates a count of the plurality of information processors to which the event notification data is to be transmitted using the event notification registration data,
         retrieves the event notification data for the event occurrence from the auxiliary storage device, and
         determines whether the count of the plurality of information processors is equal to or less than an upper limit value for an event notification count,
      the at least one information processor including an event notification data receiving unit that receives the event notification data from the image forming apparatus,
      the control unit further
         directly transmits the event notification data to each of the plurality of information processors that requested the event notification as specified by the destination addresses when the count of the plurality of information processors is equal to or less than the upper limit value for the event notification count, and
         transmits the event notification data, wherein the destination address of each of the plurality of information processors that requested the event notification is sent to the server when the count of the plurality of information processors is more than the upper limit value for the event notification count;
the server
receives the event notification data, where the destination address of each of the plurality of information processors is received from the image forming apparatus, and
transmits the event notification data to each of the plurality of information processors that requested the event notification as specified by the destination addresses; and
each of the plurality of processors that requested the event notification
receives the event notification data from one of either the image forming apparatus or the server, and
stores the event notification data, and displays the event notification data.

3. The event notification system according to claim 2, wherein each of the plurality of information processors comprise at least one of a personal computer, a smart phone, a mobile phone, or a tablet terminal.

4. An event notification method by an event notification system including an image forming apparatus connectable to a network, a plurality of information processors connectable to the network, and a server connectable to the network, the image forming apparatus storing i) event notification registration data including destination addresses of each, and received from each, information processor of the plurality of information processors that request an event notification, and ii) event notification data prepared by the image forming apparatus so as to notify the plurality of information processors of an event occurrence in the image forming apparatus, the event notification method comprising:
via the image forming apparatus
preparing the event notification data for the event occurrence, when detecting the event occurrence;
retrieving the stored event notification registration data and then retrieving the destination address of each of the plurality of information processors that requested the event notification;
calculating a count of the plurality of information processors to which the event notification data is to be transmitted using the event notification registration data;
retrieving the prepared event notification data for the event occurrence;
determining whether the count of the plurality of information processors that requested the event notification is equal to or less than an upper limit value for an event notification count;
transmitting the event notification data to each of the plurality of information processors that requested the event notification as specified by the destination addresses when the count of the plurality of information processors that requested the event notification is equal to or less than the upper limit value for the event notification count; and
transmitting the event notification data, wherein the destination address of each of the plurality of information processors that requested the event notification is sent to the server when the count of the plurality of information processors is more than the upper limit value for the event notification count;
via the server
receiving the event notification data, where the destination address of each of the plurality of information processors that requested the event notification is received from the image forming apparatus; and
transmitting the event notification data to each of the plurality of information processors that requested the event notification as specified by the destination addresses; and
via the plurality of information processors that requested the event notification
receiving the event notification data from one of either the image forming apparatus or the server; and
storing the event notification data, and displaying the event notification data.

\* \* \* \* \*